US009402025B2

United States Patent
Kobayashi

(10) Patent No.: US 9,402,025 B2
(45) Date of Patent: Jul. 26, 2016

(54) DETECTION APPARATUS, METHOD FOR DETECTING FEATURE POINT AND STORAGE MEDIUM

(71) Applicant: CANON KABUSHIKI KAISHA, Tokyo (JP)

(72) Inventor: Masaaki Kobayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 12 days.

(21) Appl. No.: 14/278,440

(22) Filed: May 15, 2014

(65) Prior Publication Data

US 2014/0347513 A1    Nov. 27, 2014

(30) Foreign Application Priority Data

May 21, 2013  (JP) ................. 2013-107479

(51) Int. Cl.
| H04N 5/232 | (2006.01) |
| G06K 9/46  | (2006.01) |
| G06K 9/00  | (2006.01) |
| G06K 9/32  | (2006.01) |
| G06K 9/20  | (2006.01) |

(52) U.S. Cl.
CPC .......... *H04N 5/23229* (2013.01); *G06K 9/2081* (2013.01); *G06K 9/4642* (2013.01); *G06K 9/4671* (2013.01); *H04N 5/23212* (2013.01); *H04N 5/23216* (2013.01); *H04N 5/23219* (2013.01); *H04N 5/23245* (2013.01)

(58) Field of Classification Search
CPC .......... H04N 5/23229; H04N 5/23212; H04N 5/23216; H04N 5/23245; H04N 5/23219; H04N 5/2329; G06K 9/4671; G06K 9/2081; G06K 9/4642; G06K 9/1642; G06K 9/00221; G06K 9/3233; G06K 9/4604
USPC ......... 348/345, 349, 362, 364, 222.1, 333.01, 348/333.02, 333.11, 333.12, 220.1, 221.1, 348/352; 382/118, 164, 171, 173, 199, 266, 382/269
See application file for complete search history.

(56) References Cited

U.S. PATENT DOCUMENTS

| 2004/0207743 A1* | 10/2004 | Nozaki et al. ............ 348/333.12 |
| 2007/0071289 A1* | 3/2007  | Takeguchi et al. ............ 382/118 |
| 2009/0116749 A1* | 5/2009  | Cristinacce et al. .......... 382/195 |
| 2009/0220157 A1* | 9/2009  | Kato et al. .................... 382/201 |
| 2010/0097515 A1* | 4/2010  | Ishii .............................. 348/349 |
| 2011/0002544 A1* | 1/2011  | Oshima ........................ 382/190 |
| 2013/0022277 A1* | 1/2013  | Morishita .................... 382/201 |
| 2013/0050516 A1* | 2/2013  | Hojo .......................... 348/208.6 |
| 2013/0076856 A1* | 3/2013  | Wakabayashi ................. 348/36 |

(Continued)

OTHER PUBLICATIONS

S. Kaddouhi et al., "A new robust face detection method based on corner points", International J. of Software Engineering and its Applications, vol. 8, No. 11, pp. 25-40 (2014).*

(Continued)

*Primary Examiner* — Tuan Ho
*Assistant Examiner* — Marly Camargo
(74) *Attorney, Agent, or Firm* — Carter, DeLuca, Farrell & Schmidt, LLP

(57) ABSTRACT

A feature point detection apparatus sets, in accordance with a shooting mode or a designation from a user, a detection parameter for each region of an image to detect a feature point, and detects the feature point based on the detection parameter.

16 Claims, 9 Drawing Sheets

(56) References Cited

U.S. PATENT DOCUMENTS

2014/0104453 A1* 4/2014 Fujinawa et al. .......... 348/222.1
2015/0049955 A1* 2/2015 Stoeffler et al. ............... 382/220

OTHER PUBLICATIONS

Edward Rosten et al., "Machine learning for high-speed corner detection", Department of Engineering, Cambridge University, UK, pp. 1-14.

Chris Harris et al., "A Combined Corner and Edge Detector", Plessey Research Roke Manor, United Kingdom, 1988, pp. 147-151.
Carlo Tomasi et al., "Shape and Motion from Image Streams: a Factorization Method Part 3 Detection and Tracking of Point Features", Technical Report CMU-CS-91-132, Apr. 1991, pp. 1-20.
Jianbo Shi, et al "Good Features to Track", IEEE Conference on Computer Vsion and Pattern Recognition (CVPR94) Seattle, Jun. 1994, pp. 1-8.
F. Chabat et al., "A Corner Orientation Detector", Image and Vision Computing 17 (1999) pp. 761-769.

* cited by examiner

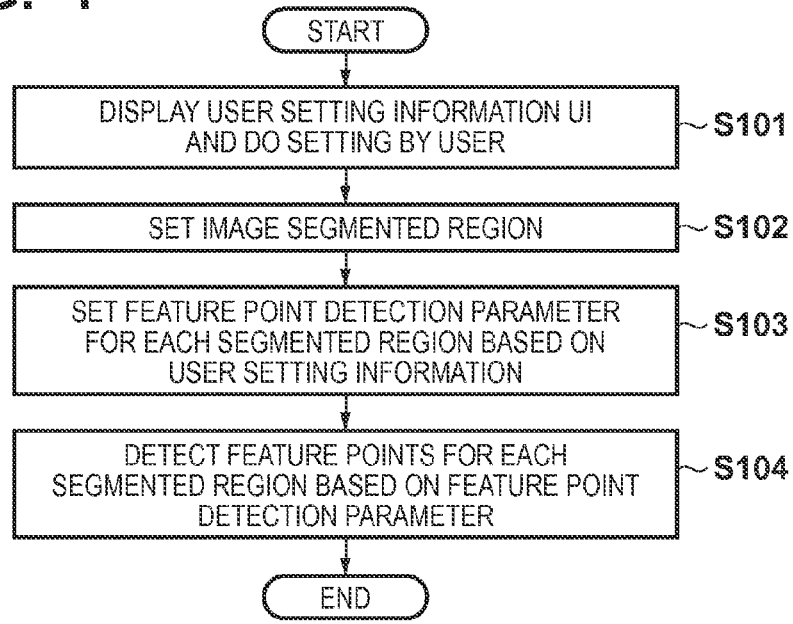
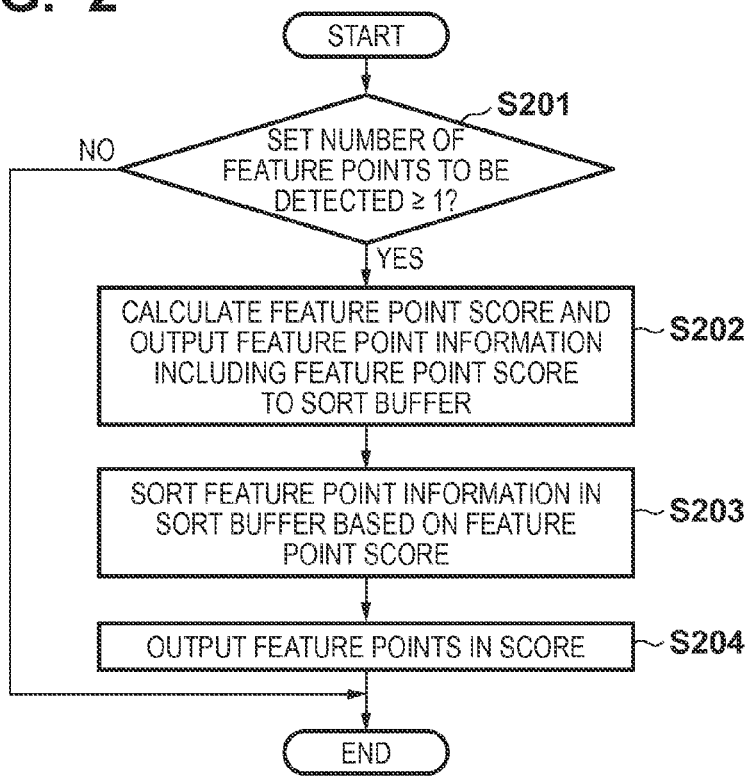

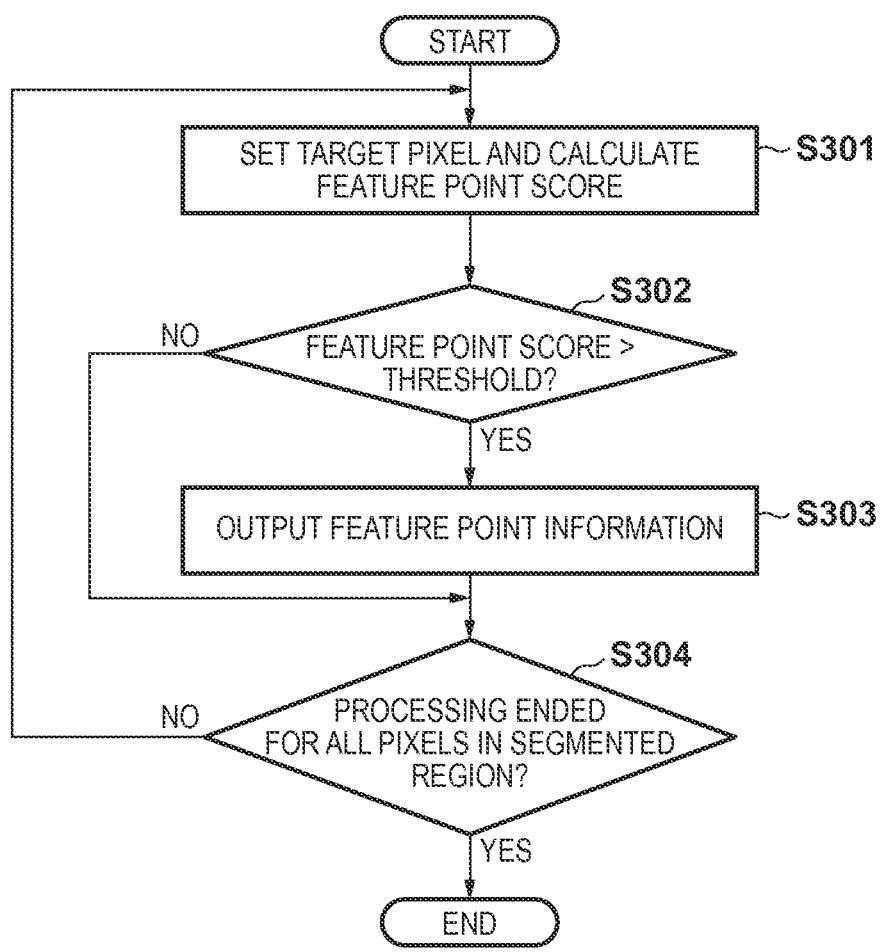

FIG. 7A
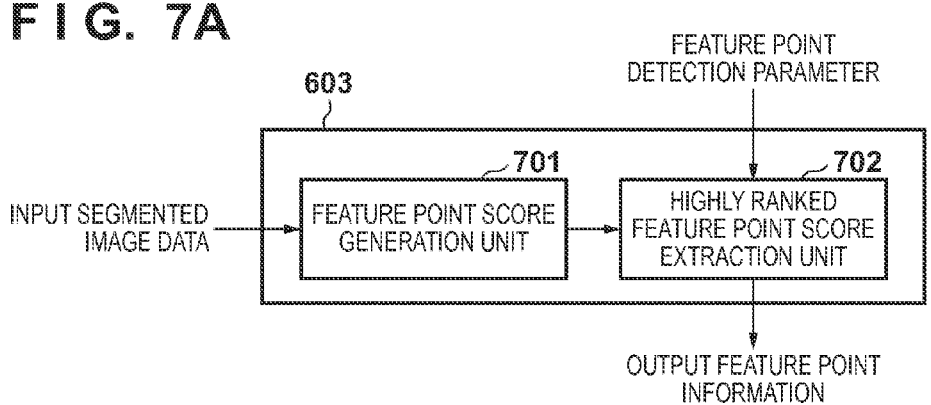
FIG. 7B
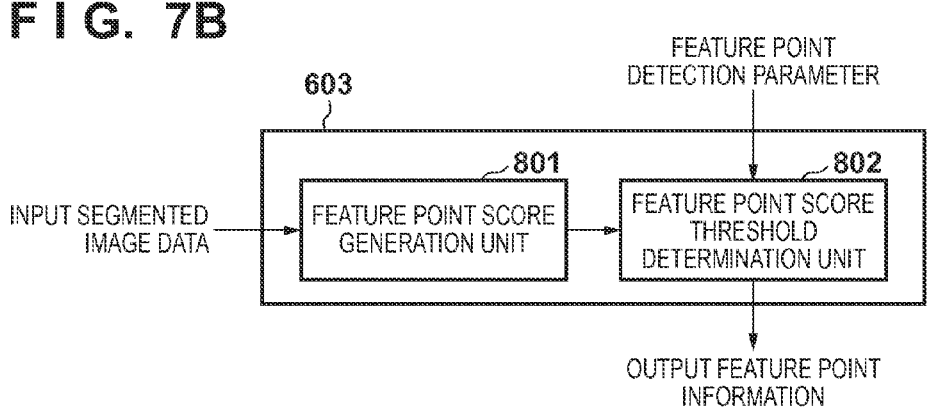
FIG. 7C
| FEATURE POINT x-COORDINATE | FEATURE POINT y-COORDINATE | FEATURE POINT SCORE |
|---|---|---|
| FEATURE POINT x-COORDINATE | FEATURE POINT y-COORDINATE | FEATURE POINT SCORE |
| FEATURE POINT x-COORDINATE | FEATURE POINT y-COORDINATE | FEATURE POINT SCORE |
| ... | ... | ... |
| FEATURE POINT x-COORDINATE | FEATURE POINT y-COORDINATE | FEATURE POINT SCORE |

FIG. 10A

| SYNTAX | DATA |
|---|---|
| MOVING IMAGE MODE FLAG | 1 |
| PRIORITY MODE | 8 |
| if (PRIORITY MODE = SCENE MODE LINK) { | |
|    SCENE TYPE | 8 |
| } | |
| if (PRIORITY MODE = DIRECT DESIGNATION) { | |
|    for (i=0 ; i<15 ; i++) { | |
|      PRIORITY REGION FLAG | 1 |
|    } | |
| } | |

FIG. 10B

| 0 | 1 | 2 | 3 | 4 |
|---|---|---|---|---|
| 5 | 6 | 7 | 8 | 9 |
| 10 | 11 | 12 | 13 | 14 |

DETECTION APPARATUS, METHOD FOR DETECTING FEATURE POINT AND STORAGE MEDIUM

BACKGROUND OF THE INVENTION

1. Field of the Invention

The present invention relates to a detection apparatus, a method for detecting a feature point and a storage medium.

2. Description of the Related Art

There is processing called feature point detection (or feature point extraction) in the computer vision field. According to non-patent literature, IEICE transaction 87 (12), 1043-1048, 2004-12-01, there exist various feature point detection methods such as a Harris operator.

As an application of feature point detection, for example, when feature points are detected from continuous images, and the detected feature points are associated between the images, the relative positions can be regarded as the moving amounts of the feature points. The motion of an object or whole image including the feature points can be obtained from the moving amounts.

The feature point detection processing puts a heavy load because processing of determining whether a pixel is a feature point is performed for all pixels of an image. When the number of feature points to be detected is large, the load of post-processing such as association also increases. On the other hand, if the number of feature points to be detected is easily decreased, the necessary number of feature points cannot be obtained in post-processing such as association, and the processing accuracy in the post-processing lowers.

SUMMARY OF THE INVENTION

The present invention provides a technique of reducing the load of feature point detection.

The present invention provides a detection apparatus for detecting a feature point in an image, comprising a setting unit configured to set, in accordance with a shooting mode in which the image has been shot, a detection parameter for each region of the image to detect the feature point, and a detection unit configured to detect the feature point based on the detection parameter set in accordance with the shooting mode.

The present invention provides a detection apparatus for detecting a feature point in an image, comprising a selection unit configured to select at least a partial region in the image based on a designation from a user, and a detection unit configured to detect the feature point in accordance with selection of the region by the selection unit.

Further features of the present invention will become apparent from the following description of exemplary embodiments with reference to the attached drawings.

BRIEF DESCRIPTION OF THE DRAWINGS

FIG. 1 is a flowchart for explaining a feature point detection method using region segmentation;

FIG. 2 is a flowchart for explaining feature point detection processing for each segmented region according to the first embodiment;

FIG. 3 is a flowchart for explaining feature point detection processing for each segmented region according to the second embodiment;

FIGS. 7A and 7B are views for explaining processing of a feature point information generation unit;

FIG. 7C is a table for explaining an example of the format of feature point information;

FIG. 10A is a view for explaining an example of the data format of user setting information; and FIG. 10B is a view for explaining an example of a segmented image in a fixed segmentation pattern.

DESCRIPTION OF THE EMBODIMENTS

Exemplary embodiments of the present invention will now be described in detail with reference to the accompanying drawings. Note that the constituent elements described in the embodiments are merely examples. The technical scope of the present invention is determined by the scope of claims and is not limited by the following individual embodiments.

Figure 8A:
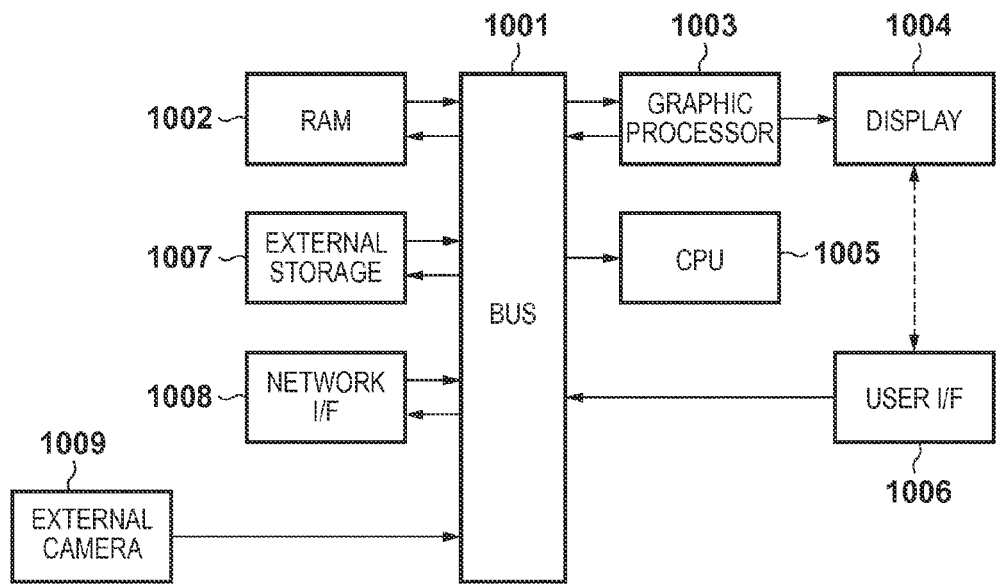
FIG. 8A is a block diagram for explaining the internal arrangement of an image processing apparatus.

A feature point detection method based on user setting information will be described. In the first embodiment, a description will be made assuming that a CPU performs feature point detection processing based on user setting information in an image processing apparatus to which a display device is connected. The arrangement of the image processing apparatus and the operation of each module will be described below with reference to FIG. 8A. FIG. 8A is a block diagram for explaining the internal arrangement of the image processing apparatus.

The image processing apparatus includes a bus 1001, a RAM 1002, a graphic processor 1003, a display 1004, a CPU 1005, and a user interface (I/F) 1006. In this embodiment, a touch panel will be exemplified as the user interface (I/F) 1006. However, the user interface (I/F) is not limited to this and may be, for example, a mouse. Reference numeral 1007 denotes a nonvolatile external storage.

The image processing apparatus also includes a network interface (I/F) 1008, and an external image capturing unit (external camera) 1009. In this embodiment, programs to be executed and data are recorded in the external storage 1007. The programs and data are input from the external storage 1007 to the RAM 1002 and executed and processed by the CPU 1005. The programs and data are input/output via the bus 1001. As for the format of image data stored in the external storage 1007, a still image uses JPEG with EXIF data, and a moving image uses MPEG-2. However, the gist of the present invention is not limited to the format described here. EXIF data records camera information at the time of shooting, such as a focus area and a scene type representing an image shooting scene.

When inputting image data, an explanation will be done assuming that the external storage 1007 loads image data, and the CPU 1005 converts the image data into an internal image format and loads it, unless specifically stated otherwise. Image data can also be input from the external camera 1009 or the network I/F 1008. The display 1004 (display unit) can display a UI (user interface) screen or an image data processing result via the graphic processor 1003.

The user interface (I/F) 1006 can input an arbitrary coordinate position (coordinate information) on the display 1004 and information representing whether the display screen of the display 1004 has been touched. The programs can share and use data stored in the external storage 1007 or the RAM 1002.

Detailed processing of the feature point detection method for a still image using region segmentation will be described below with reference to FIG. 1. Note that the description will be made assuming that the resolution is 1920 pixels×1080 pixels. However, the gist of the present invention is not limited to the resolution described here.

FIG. 1 is a flowchart for explaining a feature point detection method using region segmentation. In step S101, a user setting information UI is displayed on the screen, and the user is caused to select the priority mode of feature point detection as user setting information.

Figure 4A:
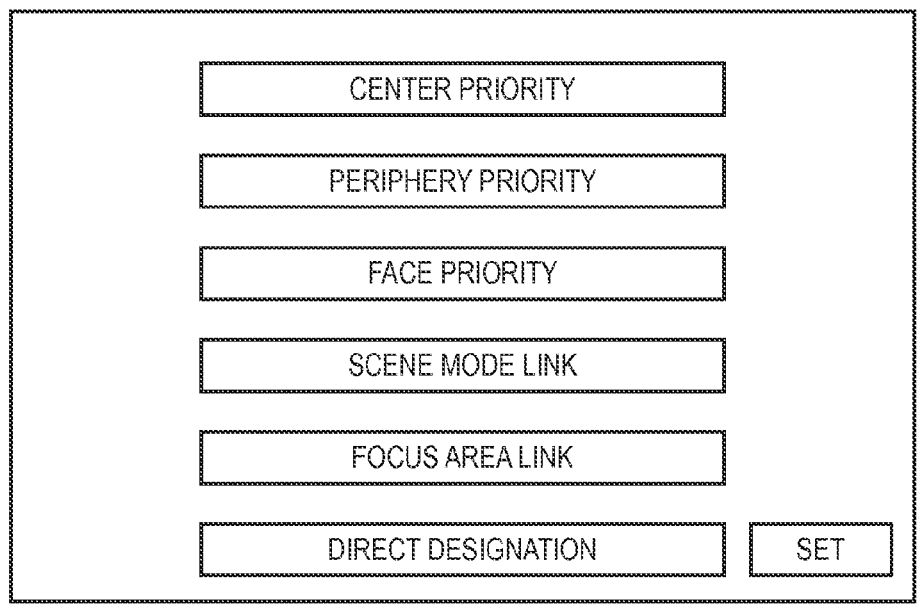
FIGS. 4A to 4C are views for explaining display examples of a user setting information UI.
Figure 4B:
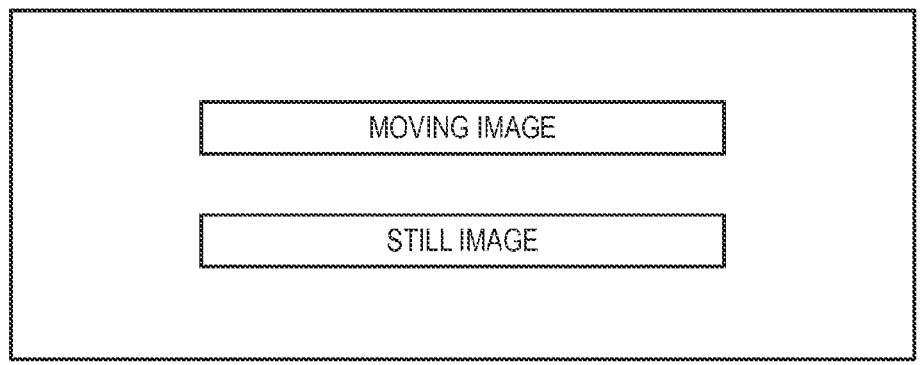
Figure 4C:
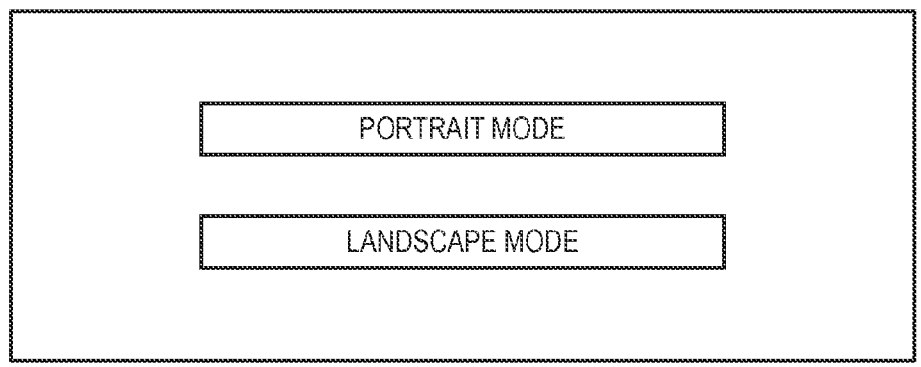

Details of the user setting information UI will be explained with reference to FIGS. 4A, 4B, and 4C. FIG. 4A is a view for explaining a display example of a priority mode selection UI screen as a user setting information UI. In this embodiment, as shown in FIG. 4A, a screen to be displayed is selected from center priority, periphery priority, face priority, scene mode link, focus area link, and direct designation. Note that in this embodiment, the user can set the priority mode by touching a button displayed on the user setting information UI. Note that the priority mode selection method is not limited to this example, and the selection may be done by, for example, a mouse operation or another input device.

Figure 9A:
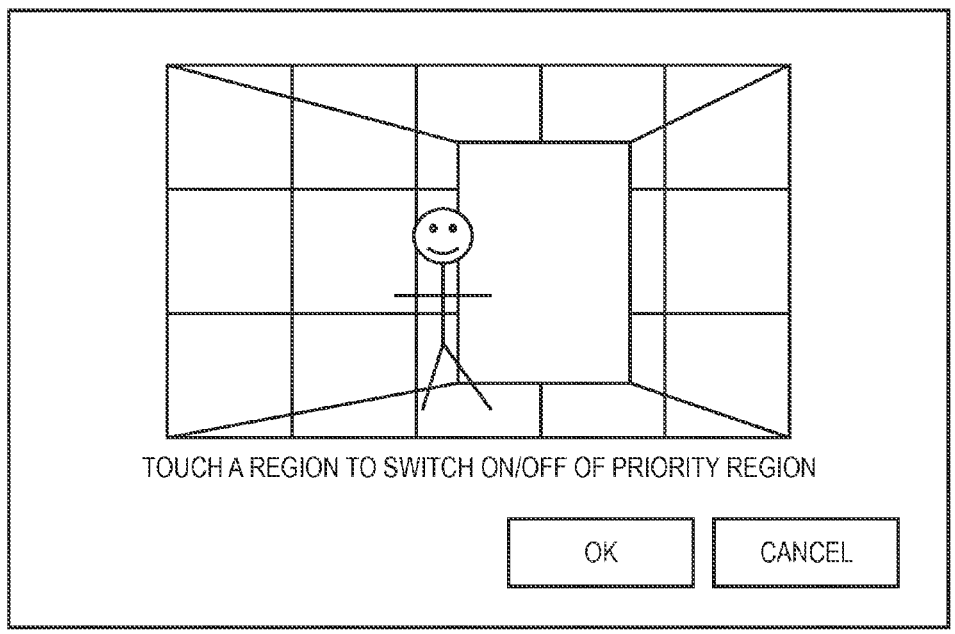
FIGS. 9A and 9B are views for explaining a region designation UI screen.
Figure 9B:
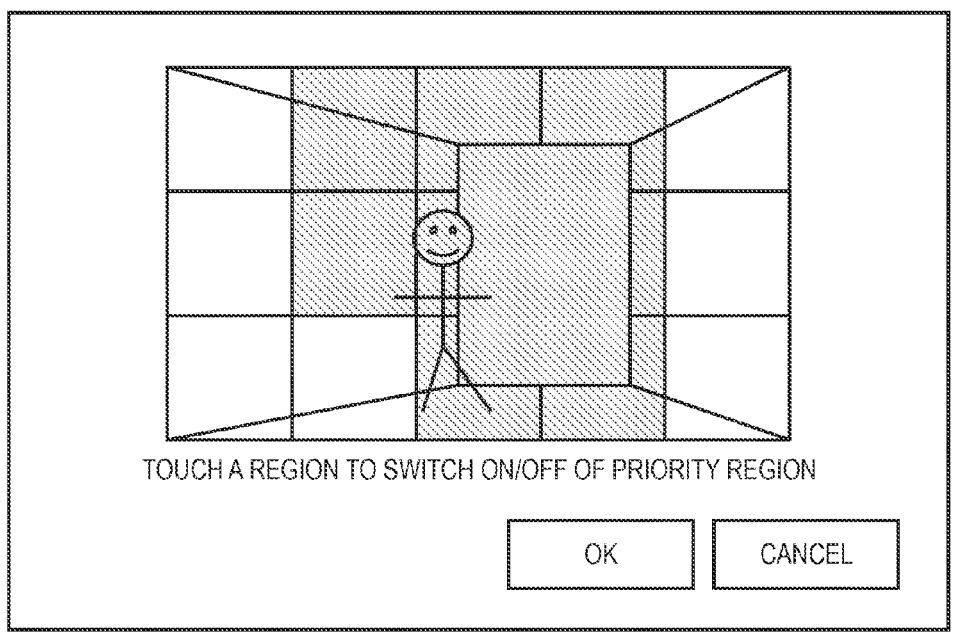

Focus area link is enabled when focus information can be acquired from image data, or focus information of an externally existing image capturing unit can be acquired. When "setting" adjacent to the direct designation button is touched, the screen transits to a region designation UI screen shown in FIG. 9A. In the region designation UI screen shown in FIGS. 9A and 9B, a hatched portion indicates a priority region, and a solid-white portion indicates a non-priority region. FIG. 9A is a view showing the initial state of region designation, in which all regions are non-priority regions. FIG. 9B is a view showing a state after region designation is changed. In FIG. 9B, segmented regions at the center of the region designation UI screen are designated as priority regions, and represented as hatched portions.

On the screen shown in FIG. 9A or 9B, the user can switch on/off of setting of the region (priority feature point detection region) to detect a feature point by touching a segmented region. A sample image is displayed on the background. An example of the operation of the user will be described below.

In the view of FIG. 9A illustrating the initial state, an entrance and a person near the entrance are displayed. For example, to detect a feature point near the entrance, when the user himself/herself touches the regions near the entrance and designates them as priority regions (hatched portions), the screen changes as shown in FIG. 9B. When the OK button is pressed, priority region information is updated as part of user setting information, and the screen returns to FIG. 4A. When the cancel button is pressed, the screen returns to FIG. 4A without updating the priority region information.

The data format of user setting information will be described here with reference to FIG. 10A. The first column of FIG. 10A represents a data syntax (a syntax that expresses a nested structure) and a data entry name. The second column expresses a data size by a bit value. In this embodiment, data is assumed to be expressed by an unsigned integer. An if-for statement expresses a control structure like the C language, but describes not a command but a data entry name.

"Operation mode flag" is a flag representing whether a captured image is a moving image or a still image. If a file or an image input from the camera is a moving image, "1" is set in the data field of the second column. For a still image, "0" is set in the data field of the second column. "Priority mode" is information set via the priority mode selection UI screen shown in FIG. 4A in step S101. "Scene type" is information representing the shooting scene of a shot image, or information representing a shooting mode such as a portrait or landscape mode designated by the user. This information is defined as scene type information. "Priority region flag" is information representing on/off of priority region setting of a segmented region and stored in the order of identification information (for example, ID=0, 1, 2, . . . , 14) assigned to the segmented regions shown in FIG. 10B.

FIG. 10B is a view for explaining pieces of identification information (IDs) assigned to the segmented regions as an example of segmented images in a fixed segmentation pattern. Note that in this embodiment, an explanation will be made assuming that an image is segmented into 3 (rows)×5 (columns), and the size of one segmented region is 384 pixels×360 pixels. There exist 15 priority region flags as many as the number of segmentations of an image. Note that the number of segmentations and the segmentation pattern are not limited to these.

Referring back to FIG. 1, in step S102, the region coordinate information of each priority region is set for the input image. Region information includes the number of priority regions and the region coordinate information of each segmented region (the upper left, upper right, lower left, and lower right coordinates of each region). In this embodiment, the region coordinate information of each segmented region by a fixed segmentation pattern will be explained as handled as a constant embedded on a program. However, the region coordinate information is not limited to this, and may be handled as a variable changeable from an external program.

In step S103, the upper limit of the number of feature points to be detected is set, based on the user setting information, as a feature point detection parameter used to control feature point detection processing for each segmented region obtained by segmenting the image in which a feature point is to be detected. In this embodiment, assume that, for example, 360 feature points are set on the entire surface as an upper limit. Since the user setting information includes priority mode information used to identify one of center priority, periphery priority, face priority, direct designation, scene mode link, and focus area link, the feature point detection parameter setting method changes depending on the priority mode.

Figure 5A:
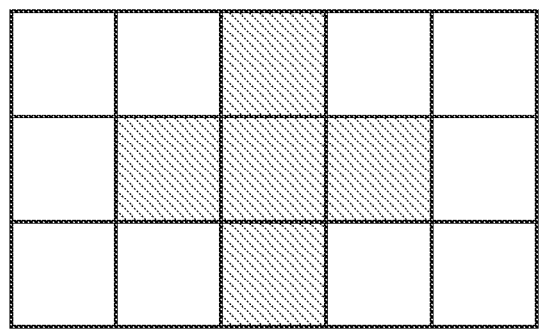
FIGS. 5A to 5D are views for explaining setting examples of priorities of segmented regions.

FIGS. 5A to 5D are views for explaining setting examples of the number of feature points to be detected as a feature point detection parameter for each priority mode. When the priority mode is center priority, priority regions are set at the center of the screen, as indicated by the hatched portions in FIG. 5A, and the number of feature points to be detected in each segmented region is set such that many feature points are detected in each priority region. When priority regions are set at the center of the screen, as shown in FIG. 5A, 360 feature points are area-distributed to the five priority regions. The number of feature points to be detected is set so as to detect 72 feature points per segmented region. The number of feature points to be detected is set to 0 for the non-priority regions.

Figure 5B:
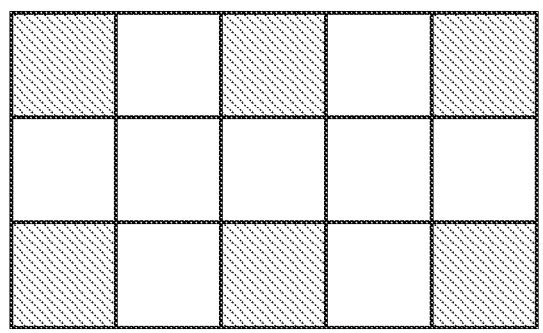

When the priority mode is periphery priority, priority regions are set in the periphery of the screen, as indicated by the hatched portions in FIG. 5B, and the number of feature points to be detected in each segmented region is set such that many feature points are detected in each priority region. When priority regions are set in the periphery of the screen, as shown in FIG. 5B, 360 feature points are area-distributed to the six priority regions. The number of feature points to be detected is set so as to detect 60 feature points per segmented region. The number of feature points to be detected is set to 0 for the non-priority regions.

In scene mode link, scene type information is acquired from image data, and the upper limit of the number of feature points to be detected in each segmented region is set such that many feature points to be detected is set in a segmented region including a main object assumed by the scene type. The operation for each scene type will be described below. When the scene type information represents portrait, the object often exists at the center of the image. For this reason, the priority regions are set at the center of the image, as indicated by the hatched portions in FIG. 5A and the number of feature points to be detected in each segmented region is set such that many feature points are detected in each priority region. As shown in FIG. 5A, 360 feature points are distributed to the five priority regions in accordance with the area. The number of feature points to be detected is set so as to detect 72 feature points per segmented region. The number of feature points to be detected is set to 0 for the non-priority regions.

When the priority mode is landscape priority, the main object exists all over the screen. Hence, priority regions are set for all segmented regions, as indicated by the hatched portions in FIG. 5D. In this embodiment, 360 points are equally distributed to the respective segmented regions. The number of feature points to be detected is set so as to detect 24 feature points in each segmented region. Note that as the scene type information, data recorded in the EXIF data is usable.

In focus link, focus area information is acquired from image data. Priority regions are set such that many feature points are detected from a segmented region including a position specified as a position where the focus is set, and the number of feature points to be detected in each segmented region is set. As the focus area information, data recorded in the EXIF data is usable.

Figure 5C:
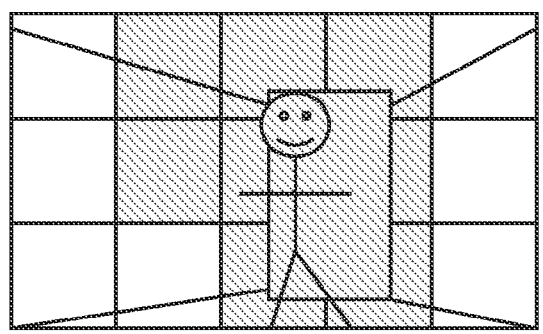
Figure 5D:
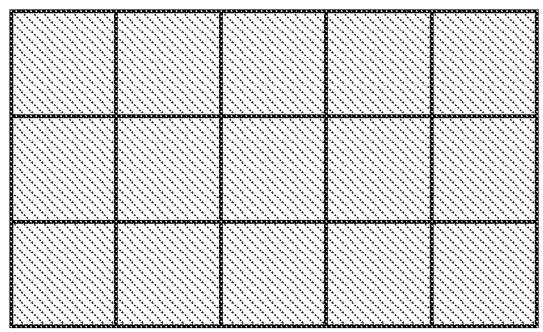

In direct designation, segmented regions are individually designated as indicated by the hatched portions in FIG. 5C. As the number of feature points to be detected, a number obtained by distributing the feature points on the entire surface to the priority regions based on the area ratio is set. The number of feature points to be detected is set to 0 for the non-priority regions.

In this embodiment, processing of all segmented regions is executed in each step, as described above. However, the present invention is not limited to this. For example, the process of each step may be executed for each segmented region, and loop processing may be executed as many times as the number of segmented regions. In the above description, the number of feature points to be detected on the entire surface is set and distributed to the priority regions. However, feature points of a predetermined ratio with respect to the area of priority regions may be detected. For example, 69 feature points corresponding to 0.05% of the number of pixels of a priority region including 384 pixels×360 pixels may be detected. In this case, the number of feature points to be detected on the entire screen changes depending on the number of priority regions.

In step S104, feature points in each segmented region are detected based on the feature point detection parameter. Feature point detection processing for each segmented region will be described below with reference to FIG. 2. FIG. 2 is a flowchart for explaining feature point detection processing for each segmented region according to the first embodiment.

In step S201, it is determined whether the set number of feature points to be detected is 1 or more. If the number of feature points to be detected is 1 or more (YES in step S201), the process advances to step S202. If it is determined in step S201 that the set number of feature points to be detected is smaller than 1 (NO in step S201), the processing ends.

In step S202, the pixels in the segmented region area scanned in the raster order. Feature point information including a feature point score is calculated for each pixel, and the feature point information including the feature point score is output to a sort buffer. The feature point information and the sort buffer will be described here with reference to FIG. 7C. FIG. 7C is a table for explaining an example of the format of feature point information. As shown in FIG. 7C, the feature point information includes information of x- and y-coordinates (position information) and a feature point score for each feature point. The sort buffer can store a plurality of pieces of feature point information as shown in FIG. 7C.

In this embodiment, assume that the feature point score is calculated by, for example, a Harris operator. When the feature point score is calculated by the Harris operator, the target image is a luminance image. When the input image is an RGB image, it is converted into a luminance image in advance.

In step S203, the pieces of feature point information in the sort buffer are sorted based on the feature point scores. As the sort method, for example, quick sort is usable. However, the sort method is not limited to this example, and another sort method such as bubble sort may be used. Note that the Harris operator indicates a higher degree of corner as the score value becomes high. Hence, sorting is done in descending order such that feature points having a high degree of corner concentrate at the start of a buffer structure shown in FIG. 7C.

In step S204, pieces of feature point information of the sorted feature points of higher rank are output. Pieces of feature point information as many as the number of feature points to be detected, which is set in step S103, are output from the start of the buffer.

In this embodiment, the Harris operator is used. However, another feature point score calculation method may be applied. In another feature point score calculation method, the degree of feature may be higher as the score value becomes low. In this case, sorting is done in ascending order.

The pieces of feature point information of each image are stored as an array. Every time feature point information is output for each region, it is added to the end of the array. However, the method of managing the feature point information of the image is not limited to this. These processes are applicable to a moving image as well. In this case, steps S102 to S104 are repetitively applied to continuous image data, thereby implementing the processes.

According to this embodiment, the regions to detect feature points are limited to priority regions. That is, the feature point detection processing need not be executed for non-priority regions in which the number of feature points to be detected is set to 0, and the processing time can be shortened.

However, the number of feature points to be detected from a non-priority region need not always be set to 0. For example, setting of the number of feature points to be detected in the entire screen is not fixed to priority regions. A predetermined number of, for example, half of feature points to be detected may be set in non-priority regions. In this case as well, since the number of feature points to be handled can be decreased as compared to a case where the number of feature points to be detected in non-priority region is set to equal the number of feature points to be detected in priority regions, the processing amount can be reduced. As described above, since the regions to detect feature points are limited based on the user setting information, feature points can be detected as intended by the user without missing many feature points.

An example of the effect of correcting blurs of a moving image using feature point detection will be described. When the priority regions are set at the center of the screen, the feature points and moving amount of a main object that tends to exist at the center of the screen in the composition can be obtained. On the other hand, to suppress blurs in the background, the priority regions are set at the periphery of the screen, and the feature points and moving amount of the background that tends to exist at the periphery of the screen in the composition can be obtained. When correction is performed based on the moving amounts of these objects, it is possible to correct blurs of an object desired by the user to correct.

The user setting can also be linked to the focus area setting but may be unlinked to the focus area setting. This makes it possible to perform blur correction for an object other than the main object, for example, the background while placing focus on the main object.

When calculating a moving amount or performing blur correction using feature point detection, the UI described concerning the processing of step S101 is presented to the user as a UI configured to designate priority regions to calculate the moving amount or designate the blur correction target because the UI is used to designate priority regions for feature point detection.

In the first embodiment, processing of setting the upper limit of the number of feature points to be detected has been described as feature point detection processing. In the second embodiment, a method will be explained in which a feature point score threshold is set, and feature points are detected based on the result of comparison between the threshold and the feature point score of each pixel. A description of contents common to the first embodiment will be omitted, and different processes will be explained below.

In step S103 of FIG. 1 described in the first embodiment, the number of feature points to be detected is set as a feature point detection parameter. In the second embodiment, the feature point score threshold is set as a feature point detection parameter for each segmented region obtained by segmenting an image to detect feature points. The feature point score threshold is the detection sensitivity of feature points. The larger the feature point score threshold is, the harder the feature point detection is.

The feature point detection amount (number of feature points to be detected) can be adjusted by changing the feature point score threshold based on the image characteristics. For example, it is possible to set the number of feature points to be detected by setting a higher threshold value for an image having a higher sharpness so that many feature points are not detected. When the feature point score exceeds the threshold, a feature point is detected. Feature point detection processing is controlled such that feature points are hardly detected when the feature point score threshold is set to a value larger than the reference threshold. The reference threshold is a preset value. The feature point score threshold is calculated by multiplying the reference threshold by a coefficient.

In step S104, feature points in each segmented region are detected based on the feature point score threshold as the feature point detection parameter. Setting of the feature point score threshold in each priority mode will exemplarily be described. When the priority mode is center priority, priority regions are set at the center of the screen, as indicated by the hatched portions in FIG. 5A. In non-priority regions indicated by the solid-white portions, for example, a value twice larger than the reference threshold is set as the feature point score threshold.

When the priority mode is periphery priority, priority regions are set at the periphery of the screen, as indicated by the hatched portions in FIG. 5B. In non-priority regions indicated by the solid-white portions, a value twice larger than the reference threshold is set as the feature point score threshold. When the priority mode is focus link, focus area information is acquired from image data. For regions other than a position designated to place focus, a value twice larger than the reference threshold is set as the feature point score threshold.

When the priority mode is direct designation, the hatched portions in FIG. 5C are presented as priority regions. For regions designated as non-priority regions without hatching, a value twice larger than the reference threshold is set as the feature point score threshold.

In scene mode link, when scene type information represents portrait, the object often exists at the center of the screen. Priority regions are set at the center of the screen, as indicated by the hatched portions in FIG. 5A. In non-priority regions indicated by the solid-white portions, a value twice larger than the reference threshold is set as the feature point score threshold. In landscape priority, the main object exists all over the screen. Hence, priority regions are set all over the screen, as indicated by the hatched portions in FIG. 5D. In non-priority regions indicated by the solid-white portions, a value twice larger than the reference threshold is set as the feature point score threshold.

With the above-described processing, the feature point score threshold in the non-priority regions is twice larger than the feature point threshold (reference threshold) in the priority regions (the detection sensitivity is ½). Feature point detection processing is thus controlled such that feature points are hardly detected in the non-priority regions as compared to the priority regions.

Feature point score threshold calculation processing and feature point detection processing according to this embodiment will be described with reference to FIG. 3. In step S301, a target pixel is set, and a feature point score is calculated. The target pixel is set by scanning the pixels in a segmented region in the raster order. In this embodiment, the feature point score is calculated using a Harris operator, as in the first embodiment.

In step S302, the feature point score threshold is compared with the feature point score calculated in step S301. If the feature point score is larger than the threshold as the result of comparison (YES in step S302), the process advances to step S303. If the feature point score is equal to or smaller than the threshold (NO in step S302), the process advances to step S304.

In step S303, feature point information determined to be larger than the threshold is output. When a value larger than the feature point threshold (reference threshold) in the priority regions is set as the feature point threshold in the non-priority regions, the feature point score hardly exceeds the threshold in the non-priority regions as compared to the priority regions. In this embodiment, a value twice larger than the reference threshold is set as the feature point threshold in the non-priority regions. For this reason, in the feature point information of the non-priority regions, the number of feature points to be detected is adjusted such that the feature point information is hardly output as compared to the priority regions. On the other hand, in the feature point information of the priority regions, the number of feature points to be detected is adjusted such that the feature point information is easily output as compared to the non-priority regions.

In step S304, it is determined whether the feature point detection processing is completed for all pixels in the segmented region. If the processing is completed (YES in step S304), the processing ends. If the feature point detection processing is not completed for all pixels in the segmented region (NO in step S304), the process returns to step S301 to execute the same processing.

According to this embodiment, the number of feature points to be detected can be controlled for each segmented region, as in the first embodiment. It is therefore possible to decrease the number of feature points to be detected in the non-priority regions and shorten the processing time. The number of feature points to be detected may be controlled for each segmented region by combining threshold setting described in this embodiment and the arrangement for setting the upper limit of the number of feature points to be detected described in the first embodiment.

Figure 8B:
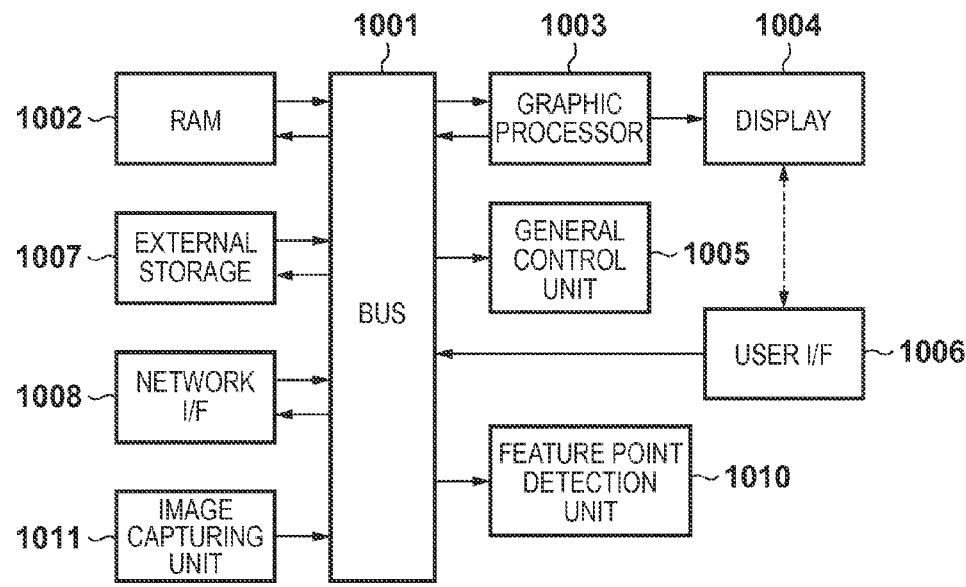
FIG. 8B is a block diagram for explaining the internal arrangement of an image capturing apparatus.

In the third embodiment, the arrangement of an image capturing apparatus (camera) including a feature point detection unit capable of executing feature point detection processing based on user setting information, and an image capturing unit will be described. The internal arrangement of the camera and the operation of each constituent element will be explained below with reference to FIG. 8B. FIG. 8B is a block diagram for explaining the internal arrangement of the camera. The camera includes a bus 1001, a RAM 1002, a graphic processor 1003, a display 1004, a CPU 1005, and a user interface (I/F) 1006. In this embodiment, a touch panel will be exemplified as the user interface (I/F) 1006. The camera also includes a nonvolatile external storage 1007, and a network interface (I/F) 1008.

A feature point detection unit 1010 executes feature point detection processing based on user setting information. An image capturing unit 1011 includes a sensor, an optical system, and a development processing unit. RAW image data captured by the sensor via the optical system undergoes digital development processing by the development processing unit. The image data is stored in the RAM 1002 as image data together with camera information at the time of shooting including focus area information and shared by the modules.

In this embodiment, a UI screen or a processed image result can be displayed on the display 1004 via the graphic processor 1003. The user interface (I/F) 1006 can input an arbitrary coordinate position (coordinate information) on the display 1004 and information representing whether the display screen of the display 1004 has been touched. Programs can share and use data stored in the external storage 1007 or the RAM 1002.

The CPU 1005 generates user setting information in accordance with the same method as described in the first embodiment. A user setting information UI is the same as described with reference to FIGS. 4A, 4B, and 4C. In this embodiment, the user can set various modes via UI screens illustrated in FIGS. 4A, 4B, and 4C displayed by pressing a menu button displayed on the user interface (I/F) 1006 of the camera.

The user sets a priority mode via the priority mode selection UI screen shown in FIG. 4A. The user selects to shoot a moving image or a still image via the UI screen shown in FIG. 4B. The user selects a scene type via the UI screen shown in FIG. 4C. Scene types include a portrait mode and a landscape mode. The focus area, white balance, and the like at the time of shooting are decided in accordance with the scene type. Concerning display of the screens shown in FIGS. 4A, 4B, and 4C, the screen transits and is displayed based on a hierarchical menu configuration.

Note that the moving image/still image or scene type need not always be selected via a UI screen, and may be selected by operating a physical operation unit (for example, dial) provided on the camera. Processing of the feature point detection unit 1010 that detects feature points in each segmented region obtained by segmenting a still image will be described below with reference to FIG. 6.

A setting unit 601 accepts input of user setting information and camera information including focus area information representing a focus area for an object. The setting unit 601 acquires the camera information including the focus area information from the image capturing unit 1011. The setting unit 601 sets the number of feature points to be detected using the user setting information in accordance with the same method as described in the first embodiment. If the user setting information indicates scene mode link, the setting unit 601 sets priority regions based on the scene type, and sets the number of feature points to be detected as a feature point detection parameter as in the first embodiment.

If the user setting information indicates focus link, the number of feature points to be detected is set as a feature point detection parameter as in the first embodiment using the focus area information included in the camera information acquired from the image capturing unit 1011. Note that the processing of the setting unit 601 can also be executed by the CPU that performs general-purpose processing.

An image segmentation unit 602 segments the input image based on a preset segmentation pattern and outputs the segmented image to a feature point information generation unit 603. FIG. 10B shows an example of a preset segmentation pattern.

The feature point information generation unit 603 detects feature points in each image segmented by the image segmentation unit 602 based on the feature point detection parameter set by the setting unit 601, and outputs the detected feature point information.

Details of processing of the feature point information generation unit 603 will be described below with reference to FIG. 7A. A feature point score generation unit 701 calculates the feature point score of each pixel of a segmented image in the scan order, and outputs the feature point score to a highly ranked feature point score extraction unit 702. In this embodiment, the feature point score is calculated by, for example, a Harris operator, as in the first embodiment.

The highly ranked feature point score extraction unit 702, in which the number of feature points to be detected is set as the feature point detection parameter, holds feature point information (feature point scores) as many as the number of feature points to be detected. For example, assume that the number of feature points to be detected set for a priority region is N (N is an integer). In this case, when feature point information whose score is higher than feature point information held at the Nth rank from the top is input from the feature point score generation unit 701, the Nth feature point information having the lower score is discarded. The input feature point information having the higher score is held as the Nth feature point information.

When the processing has ended for all pixels of the segmented image, the pieces of held feature point information are output. For example, when the number of feature points to be detected is set to N, pieces of feature point information including the top-ranked feature point information having the largest value to the Nth-ranked feature point information are output in descending order.

According to this embodiment, the regions to detect feature points are limited to priority regions. That is, the feature point detection processing need not be executed for non-priority regions in which the number of feature points to be detected is set to 0, and the processing time can be shortened.

In the third embodiment, processing of setting the upper limit of the number of feature points to be detected in the highly ranked feature point score extraction unit 702 has been described. In the fourth embodiment, a method will be explained in which a threshold for feature point detection is set, and feature points are detected based on the result of comparison between the threshold and the feature point score of each pixel.

Figure 6:
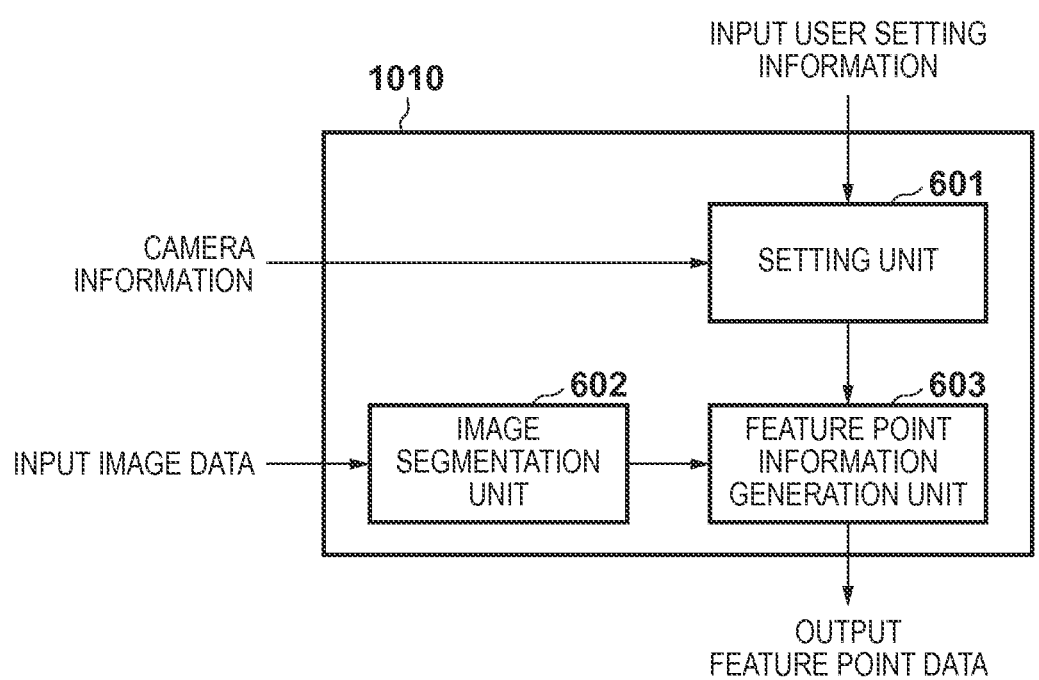
FIG. 6 is a view for explaining processing of a feature point detection unit.

The feature point detection parameter set by the setting unit 601 in FIG. 6 described in the third embodiment is the number of feature points to be detected. In the fourth embodiment, the feature point detection parameter is not the number of feature points to be detected but a feature point score threshold.

In this embodiment, a reference threshold is set in advance, and a feature point score threshold obtained by multiplying the reference threshold by a coefficient is used as a feature point detection parameter for each segmented region.

A setting unit 601 accepts input of user setting information and camera information including focus area information representing a focus area. The setting unit 601 sets a feature point score threshold for each segmented region obtained by segmenting an image to detect feature points as a feature point detection parameter for each segmented region, as in the second embodiment.

If the user setting information indicates scene mode link, the setting unit 601 sets the feature point score threshold based on the scene type as described in the second embodiment.

If the user setting information indicates focus link, the setting unit 601 acquires the focus area information included in the camera information acquired from an image capturing unit 1011. The setting unit 601 sets a threshold larger than the reference threshold (for example, a value twice larger than the reference threshold) for regions other than a position designated to place focus as the feature point score threshold.

The remaining feature point score threshold settings according to priority modes based on user setting information are the same as described in the second embodiment. The setting unit 601 sets a value larger than the feature point threshold (reference threshold) in the priority regions (for example, a value twice larger than the reference threshold) as the feature point score threshold in non-priority regions. Feature point detection processing is thus controlled such that feature points are hardly detected in the non-priority regions as compared to the priority regions.

Based on the feature point detection parameter set by the setting unit 601, a feature point information generation unit 603 sets a feature point threshold for each image segmented by an image segmentation unit 602. When the feature point score exceeds the threshold, the feature point information generation unit 603 detects a feature point and outputs the detected feature point information. Details of processing of the feature point information generation unit 603 will be described below with reference to FIG. 7B.

A feature point score generation unit 801 calculates the feature point score of each pixel of a segmented image in the scan order, and outputs the feature point score to a feature point score threshold determination unit 802. The feature point score threshold determination unit 802 compares the feature point score threshold with the feature point score generated by the feature point score generation unit 801, as in the method described concerning step S302 of FIG. 3. If the feature point score is larger than the threshold as the result of comparison, the feature point score (feature point information) determined to be larger than the threshold is output. This processing corresponds to step S303 of FIG. 3.

If the feature point score is equal to or smaller than the threshold, it is determined whether the feature point detection processing is completed for all pixels in the segmented region, without outputting the feature point score (feature point information). If the processing is completed, the processing ends. This processing corresponds to step S304 of FIG. 3.

According to this embodiment, the number of feature points to be detected can be controlled for each segmented region. It is therefore possible to decrease the number of feature points to be detected in the non-priority regions and shorten the processing time. The number of feature points to be detected may be controlled for each segmented region by combining threshold setting described in this embodiment and the arrangement for setting the upper limit of the number of feature points to be detected described in the first embodiment.

According to the above-described embodiments, the minimum necessary number of feature points are detected in each segmented region in accordance with the application purpose or user setting, thereby reducing the load of feature point detection processing. This makes it possible to reduce the processing load without lowering the processing accuracy in post-processing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-107479, filed May 21, 2013, which is hereby incorporated by reference herein in its entirety.

What is claimed is:

1. A detection apparatus for detecting feature points in an image, the detection apparatus comprising a processor and a memory storing instructions which, when executed by the processor, cause the detection apparatus to:

receive a shooting mode for shooting the image;

set a number of feature points to be detected from first and second regions of the image when the shooting mode is a first mode such that a ratio between a number of feature points detected from the first region of the image when the shooting mode is the first mode and a number of feature points detected from the second region of the image when the shooting mode is the first mode is larger than a ratio between a number of feature points detected from the first region of the image when the shooting mode is a second mode and a number of feature points detected from the second region of the image when the shooting mode is the second mode; and detect the feature points of the number set in accordance with the shooting mode.

2. The apparatus according to claim 1, wherein the first shooting mode includes a portrait mode.

3. The apparatus according to claim 1, wherein the feature points are detected in accordance with a degree of corner.

4. The apparatus according to claim 1, wherein the first region of the image is a central region of the image.

5. A detection apparatus for detecting feature points in an image, the detection apparatus comprising a processor and a memory storing instructions which, when executed by the processor, cause the detection apparatus to:

set a number of feature points to be detected from first and second regions of the image such that more feature points are detected from the first region of the image than the second region of the image when a focus portion of the image is included in the first region and is not included in the second region and more feature points are detected from the second region of the image than the first region of the image when the focus portion of the image is included in the second region and not included in the first region; and detect the feature points of the number set in accordance with the focus position.

6. The apparatus according to claim 5, wherein the feature points are detected in accordance with a degree of corner.

7. A detection method of a detection apparatus for detecting feature points in an image, comprising:

inputting a shooting mode for shooting the image;

setting a number of feature points to be detected from a region of the image when the shooting mode is a first mode such that a ratio between a number of feature points detected from the first region of the image when the shooting mode is the first mode and a number of feature points detected from the second region of the image when the shooting mode is the first mode is larger than a ratio between a number of feature points detected from the first region of the image when the shooting mode is a second mode and a number of feature points detected from the second region of the image when the shooting mode is the second mode; and detecting the feature points of the number set in accordance with the shooting mode.

8. The method according to claim 7, wherein the first shooting mode includes a portrait mode.

9. The method according to claim 7, wherein the first region of the image is a central region of the image.

10. A detection method of a detection apparatus for detecting feature points in an image, comprising:

setting a number of feature points to be detected from first and second regions of the image such that more feature points are detected from the first region of the image than the second region of the image when a focus portion of the image is included in the first region and is not included in the second region and more feature points are detected from the second region of the image than the first region of the image when the focus portion of the image is included in the second region and not included in the first region; and detecting the feature points of the number set in accordance with the focus position.

11. The method according to claim 10, wherein the feature points are detected in accordance with a degree of corner.

12. A non-transitory computer-readable storage medium storing a computer program configured to detect feature points in an image, the program comprising instructions that, when executed by a processor, cause the processor to:

receive a shooting mode for shooting the image;

set a number of feature points to be detected from each region of the image when the shooting mode is a first mode such that a ratio between a number of feature points detected from the first region of the image when the shooting mode is the first mode and a number of feature points detected from the second region of the image when the shooting mode is the first mode is larger than a ratio between a number of feature points detected from the first region of the image when the shooting mode is a second mode and a number of feature points detected from the second region of the image when the shooting mode is the second mode; and detect the feature points of the number set in accordance with the shooting mode.

13. The non-transitory computer-readable storage medium according to claim 12, wherein the first shooting mode includes a portrait mode.

14. The non-transitory computer-readable storage medium according to claim 12, wherein the first region of the image is a central region of the image.

15. A non-transitory computer-readable storage medium storing a computer program configured to detect feature points in an image, the program comprising instructions that, when executed by a processor, cause the processor to:

set a number of feature points to be detected from the image such that more feature points are detected from the first region of the image than the second region of the image when a focus portion of the image is included in the first region and is not included in the second region and more feature points are detected from the second region of the image than the first region of the image when the focus portion of the image is included in the second region and not included in the first region; and detect the feature points of the number set in accordance with the focus position.

16. The non-transitory computer-readable storage medium according to claim 15, wherein the feature points are detected in accordance with a degree of corner.

* * * * *